US012036431B2

(12) United States Patent
Krutskevych et al.

(10) Patent No.: US 12,036,431 B2
(45) Date of Patent: Jul. 16, 2024

(54) CRACK DETECTION FUNCTION FOR A FIRE SPRINKLER WITH FRANGIBLE BULB

(71) Applicant: MARIOFF CORPORATION OY, Vantaa (FI)

(72) Inventors: Nazar Krutskevych, Pomorske (PL); Wojciech Zimny, Pomorske (PL); Danylo Kypybida, Pomorske (PL)

(73) Assignee: MARIOFF CORPORATION OY, Vantaa (FI)

( * ) Notice: Subject to any disclaimer, the term of this patent is extended or adjusted under 35 U.S.C. 154(b) by 517 days.

(21) Appl. No.: 16/972,467

(22) PCT Filed: Dec. 2, 2019

(86) PCT No.: PCT/EP2019/083251

§ 371 (c)(1),
(2) Date: Dec. 4, 2020

(87) PCT Pub. No.: WO2020/114942

PCT Pub. Date: Jun. 11, 2020

(65) Prior Publication Data

US 2021/0299501 A1 Sep. 30, 2021

(30) Foreign Application Priority Data

Dec. 5, 2018 (EP) .................................... 18397531

(51) Int. Cl.
*A62C 37/50* (2006.01)
*A62C 37/14* (2006.01)

(52) U.S. Cl.
CPC ............. *A62C 37/50* (2013.01); *A62C 37/14* (2013.01)

(58) Field of Classification Search
CPC .......... A62C 37/04; A62C 37/14; A62C 37/50
See application file for complete search history.

(56) References Cited

U.S. PATENT DOCUMENTS 3,416,359 A 12/1968 Durbin et al.
3,678,756 A 7/1972 Merrill
4,739,835 A 4/1988 Polan et al.
(Continued)

FOREIGN PATENT DOCUMENTS

CN 202078685 U 12/2011
CN 202751724 U 2/2013
(Continued)

OTHER PUBLICATIONS

Communication Pursuant to Article 94(3) EPC mailed Jun. 8, 2021 for Application No. 18397531.7, 10 pages.
(Continued)

*Primary Examiner* — Darren W Gorman
(74) *Attorney, Agent, or Firm* — CANTOR COLBURN LLP

(57) ABSTRACT

Provided are embodiments including a sprinkler, a method for operating a sprinkler, and a sprinkler system. Embodiments include receiving a signal and triggering a test of a bulb responsive to the signal. Embodiments include heating fluid in the bulb responsive to the triggering the test. Embodiments also include detecting a condition of the bulb, wherein the one or more sensing elements are in contact with the fluid in the bulb, and transmitting a notification to a device indicating the condition of the bulb.

20 Claims, 5 Drawing Sheets

(56) References Cited

U.S. PATENT DOCUMENTS

| | | | | |
|---|---|---|---|---|
| 4,831,870 | A | 5/1989 | Smith | |
| 5,616,830 | A | 4/1997 | Wodeslavsky et al. | |
| 5,971,080 | A | 10/1999 | Loh et al. | |
| 7,379,553 | B2 | 5/2008 | Nakajima et al. | |
| 7,633,393 | B2 | 12/2009 | Bonne | |
| 8,395,496 | B2 | 3/2013 | Joshi et al. | |
| 8,418,815 | B2 | 4/2013 | Encinas Carreno et al. | |
| 8,573,315 | B1 | 11/2013 | Taylor | |
| 8,893,813 | B2 | 11/2014 | Kochelek et al. | |
| 9,095,736 | B2 | 8/2015 | Kochelek et al. | |
| 9,315,078 | B2 | 4/2016 | Wang et al. | |
| 2002/0053440 | A1 | 5/2002 | Gil | |
| 2007/0240886 | A1* | 10/2007 | Kil | A62C 37/50 169/39 |
| 2017/0304664 | A1* | 10/2017 | Tanklevski | A62C 37/14 |
| 2018/0200552 | A1* | 7/2018 | Wertsberger | A62C 37/40 |
| 2018/0214726 | A1 | 8/2018 | Nelson et al. | |
| 2018/0361183 | A1* | 12/2018 | Tanklevski | A62C 37/04 |
| 2019/0344110 | A1* | 11/2019 | Tanklevskij | A62C 37/50 |

FOREIGN PATENT DOCUMENTS

| | | | |
|---|---|---|---|
| CN | 104606827 | A | 5/2015 |
| CN | 103203087 | B | 9/2015 |
| CN | 105092586 | A | 11/2015 |
| CN | 106568478 | A | 4/2017 |
| CN | 108061613 | A | 5/2018 |
| EP | 3623019 | A1 | 3/2020 |
| EP | 3662976 | A1 | 10/2020 |
| KR | 1020170009203 | A | 1/2017 |

OTHER PUBLICATIONS

International Search Report and Written Opinion for International Application No. PCT/EP2019/083251; International Filing Date: Dec. 2, 2019; Mailing Date: Feb. 13, 2020; 12 pages.

Wikipedia, "Wireless Power Transfer", URL: https://en.wikipedia.org/w/index.php?tigle=Wireless_power_transfer&oldid=859024997, Retrieved: Jan. 2, 2019; 24 pages.

* cited by examiner

400

CRACK DETECTION FUNCTION FOR A FIRE SPRINKLER WITH FRANGIBLE BULB

BACKGROUND

The present disclosure relates generally to sprinkler devices, and more specifically to performing a crack detection function for an IoT fire sprinkler with frangible bulb.

Sprinkler systems typically include a plurality of sprinklers for emitting a fire suppression fluid in the event of a fire. Systems may track the location and/or status of each sprinkler using "smart" sprinklers fitted with wiring, sensors, processors, etc. Such sprinklers can be difficult to install on existing water distribution networks since the electronics must be implemented inside the sprinkler body. Furthermore, such installations may require additional certification prior to operation. Finally, the installed systems require periodic maintenance which can become a manually cumbersome task.

BRIEF SUMMARY

According to an embodiment, a sprinkler is provided. The sprinkler includes a sprinkler body having a fluid inlet, a seal configured to prevent fluid flow through the sprinkler body when the seal is in a first position, and a bulb configured to retain the seal in the first position, the bulb configured to break at a temperature and allow the seal to move to a second position allowing fluid flow through the sprinkler body. The bulb includes a wireless power and communication unit configured to receive a test mode signal, an energy storing unit configured to store energy for a heating element, wherein the energy is received from the wireless power and communication unit, and a control unit operably coupled to the wireless power and communication unit and the energy storing unit, wherein the control unit is configured to trigger a test of the sprinkler bulb. The bulb also includes the heating element configured to supply the energy to the fluid in the bulb responsive to the trigger, one or more sensing elements configured to detect a condition of the bulb and the one or more sensing elements are in contact to the fluid in the bulb, and wherein the wireless power and communication unit is configured to transmit a notification indicating a detected condition of the bulb.

In addition to one or more of the features described herein, or as an alternative, further embodiments include conditions of the bulb that indicate an intact bulb or a crack in the bulb.

In addition to one or more of the features described herein, or as an alternative, further embodiments include a control unit that includes a memory configured to store a device identifier.

In addition to one or more of the features described herein, or as an alternative, further embodiments include one or more sensing elements that includes at least one of a temperature sensor or a pressure sensor.

In addition to one or more of the features described herein, or as an alternative, further embodiments include switching an operation of the bulb from a normal mode to a test mode responsive to receiving the test mode signal.

In addition to one or more of the features described herein, or as an alternative, further embodiments include a that bulb is a thermally responsive frangible bulb configured to break at a threshold temperature allowing the seal to move to a second position when operating in a normal mode.

In addition to one or more of the features described herein, or as an alternative, further embodiments include a wireless power and communication unit including an RFID device configured to receive the wireless signal.

According to embodiments, methods for operating a sprinkler are provided. The method includes receiving a signal, triggering a test of a bulb responsive to the signal, and heating, by the heating element, fluid in the bulb responsive to the triggering the test. The method includes detecting a condition of the bulb, wherein the one or more sensing elements are in contact with the fluid in the bulb, and transmitting a notification to a device indicating the condition of the bulb.

In addition to one or more of the features described herein, or as an alternative, further embodiments include conditions of the bulb that indicate at least one of an intact bulb or a crack in the bulb.

In addition to one or more of the features described herein, or as an alternative, further embodiments include storing a device identifier of the bulb in a memory.

In addition to one or more of the features described herein, or as an alternative, further embodiments include one or more sensing elements that have at least one of a temperature sensor or a pressure sensor.

In addition to one or more of the features described herein, or as an alternative, further embodiments include switching an operation of the bulb from a normal mode to a test mode responsive to receiving the test mode signal.

In addition to one or more of the features described herein, or as an alternative, further embodiments include a bulb that is a thermally responsive frangible bulb configured to break at a threshold temperature allowing the seal to move to a second position when operating in a normal mode.

In addition to one or more of the features described herein, or as an alternative, further embodiments include communicating using an RFID device associated with the bulb.

In addition to one or more of the features described herein, or as an alternative, further embodiments include transmitting a sprinkler identifier, temperature measurements and pressure measurements of the environment within the bulb.

In addition to one or more of the features described herein, or as an alternative, further embodiments include controlling a heating element responsive to detecting a threshold temperature value by one or more temperature sensors.

According to another embodiment, a sprinkler system is provided. The system includes a fluid source, a pipe coupled to the fluid source, and a sprinkler coupled to the pipe, the sprinkler including a bulb housing a circuit elements configured to perform a test. The circuit includes a wireless power and communication unit configured to receive a test mode signal, an energy storing unit configured to store energy for a heating element, wherein the energy is received from the wireless power and communication unit, and a control unit operably coupled to the wireless power and communication unit and the energy storing unit, wherein the control unit is configured to trigger a test of the sprinkler bulb. The circuit also includes a heating element configured to supply the energy to the fluid in the bulb responsive to the trigger, one or more sensing elements configured to detect a condition of the bulb and the one or more sensing elements are in contact to the fluid in the bulb, and wherein the wireless power and communication unit is configured to transmit a notification indicating a detected condition of the bulb.

In addition to one or more of the features described herein, or as an alternative, further embodiments include a memory that stores a history of temperature measurements and pressure measurements that can indicate a normal condition or abnormal condition of the bulb.

In addition to one or more of the features described herein, or as an alternative, further embodiments include a control unit that switches operation of the bulb from a normal mode to a test mode responsive to receiving the test mode signal.

In addition to one or more of the features described herein, or as an alternative, further embodiments include a wireless power and communication unit that transmits the notification, wherein the notification includes transmitting a sprinkler identifier, temperature measurements and pressure measurements of the environment within the bulb.

Technical effects of embodiments of the present disclosure include a fire sprinkler system that uses a frangible and further includes performing crack detection function in the bulb. This diagnostic function/mechanism ensures the integrity of the frangible bulb. The techniques described herein obviate the need for manual inspection and can be performed in automatically from a remote location.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Sprinklers are distributed throughout an area to provide fire suppression in the event a fire occurs. Over a period of time, the sprinklers are required to be inspected to ensure the sprinklers are operational. The inspections include a visual inspection of the bulb that is observed by an operator. The damage to the bulbs can occur during transportation from manufacturer to customer, during installation, or defect in the bulb. Micro-cracks in the bulb can cause improper operation of the bulb where enough pressure will not build up inside the bulb to break the bulb to activate the sprinkler.

Existing solutions for crack detection of fire sprinkler frangible bulbs are based on visual inspection of the bulb and are complex for field applications. In addition, the existing solutions can provide imprecise results and are limited to detect only noticeable differences due to the subjectivity and experience of the technician performing the inspection. The health and condition of the bulbs are critical for the safety and protection of people and equipment. Cracked bulbs will not be able to respond in a timely manner because sufficient pressure will not be generated in the bulb to crack the bulb to activate the sprinkler system.

The techniques described herein provide for a continuous and addressable crack detection of the fire sprinkler frangible bulb. The techniques also replace human visual inspection with automatic inspection to detect any issues with the frangible bulb. This reduces the subjectivity of the human visual inspection and increases the reliability of the results.

Figure 1:
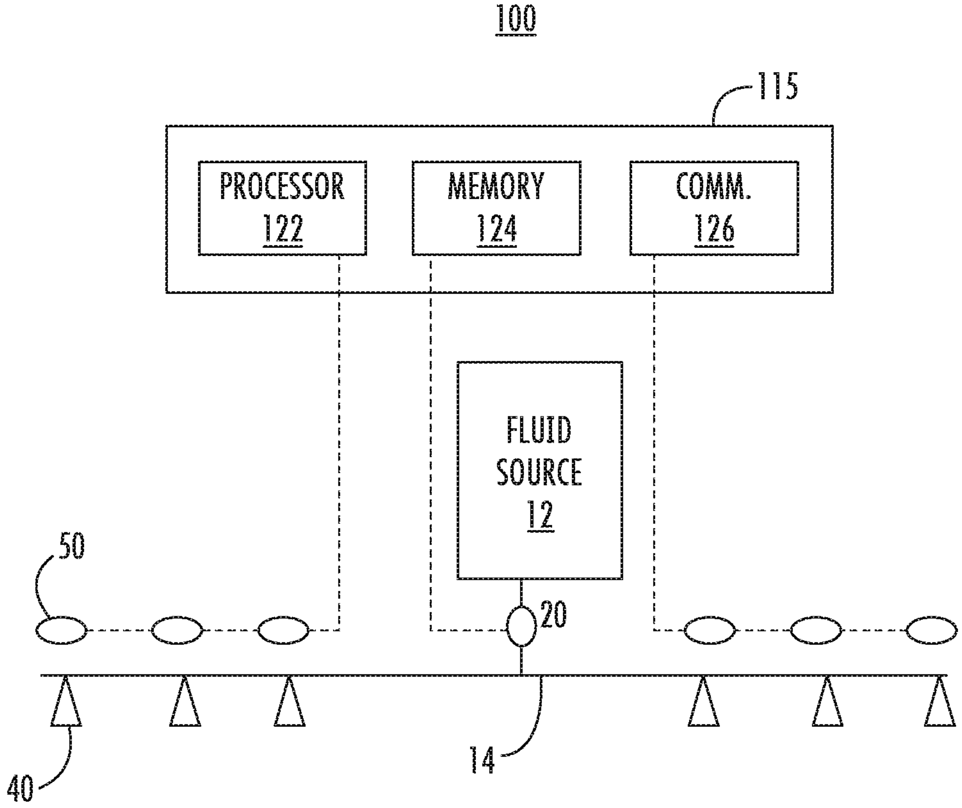
FIG. 1 depicts a sprinkler system including a sprinkler with a remote release function in accordance with one or more embodiments.

FIG. 1 depicts a sprinkler system 100 in an example embodiment. The sprinkler system 100 includes a fluid source 12 connected to one or more sprinklers 40 via one or more pipes 14. The fluid source 12 may be water and may be under pressure to direct the fluid to the sprinklers 40. In other embodiments, a pump may be used to direct fluid to the sprinklers 40. The sprinkler system 100 may be a "wet pipe" type system, in which fluid is present in pipes 14. Upon breakage of a bulb at a sprinkler 40, a seal is opened and fluid is emitted at the sprinkler 40.

A controller 115 communicates with elements of the sprinkler system 100 as described herein. The controller 115 may include a processor 122, a memory 124, and communication module 122. The processor 122 can be any type or combination of computer processors, such as a microprocessor, microcontroller, digital signal processor, application specific integrated circuit, programmable logic device, and/or field programmable gate array. The memory 124 is an example of a non-transitory computer readable storage medium tangibly embodied in the controller 115 including executable instructions stored therein, for instance, as firmware. The communication module 126 may implement one or more communication protocols to communicate with other system elements. The communication module 126 may communicate over a wireless network, such as 802.11x (WiFi), short-range radio (Bluetooth), or any other known type of wireless communication. The communication module 126 may communicate over wired networks such as LAN, WAN, Internet, etc.

One or more readers 50 obtain an identifier from each sprinkler 40. The readers 50 may be RFID readers that read a unique, sprinkler identification code from an identification device at each sprinkler 40. In one embodiment, a single reader 50 is associated with each sprinkler 40 in a one-to-one fashion. The readers 50 may communicate with one or more sprinklers 40 using wireless protocols (NFC, radio waves, etc.). The readers 50 communicate with controller 115 over a wireless and/or wired network. The readers 50 may also form a mesh network, where data is transferred from one reader 50 to the next, eventually leading to the controller 115. Each reader 50 is programmed with a unique, reader identification code that identifies each reader 50 to the controller 115.

The sprinkler system 100 includes one or more sensors 20. Sensor 20 detects one or more fluid parameters, such as fluid pressure in pipes 14 or fluid flow in pipes 14. Sensor(s) 20 may be located at the outlet of the fluid source 12 or along various locations along pipes 14. The fluid parameter is used by the controller 115 to determine the status of the sprinkler system 100 (e.g., has a sprinkler 40 been activated). Sensor 20 communicates with controller 115 over a wireless and/or wired network. Controller 115 uses the fluid parameter from sensor 20 and the presence or absence of sprinkler identification codes to determine the state of each sprinkler 40.

Figure 2:
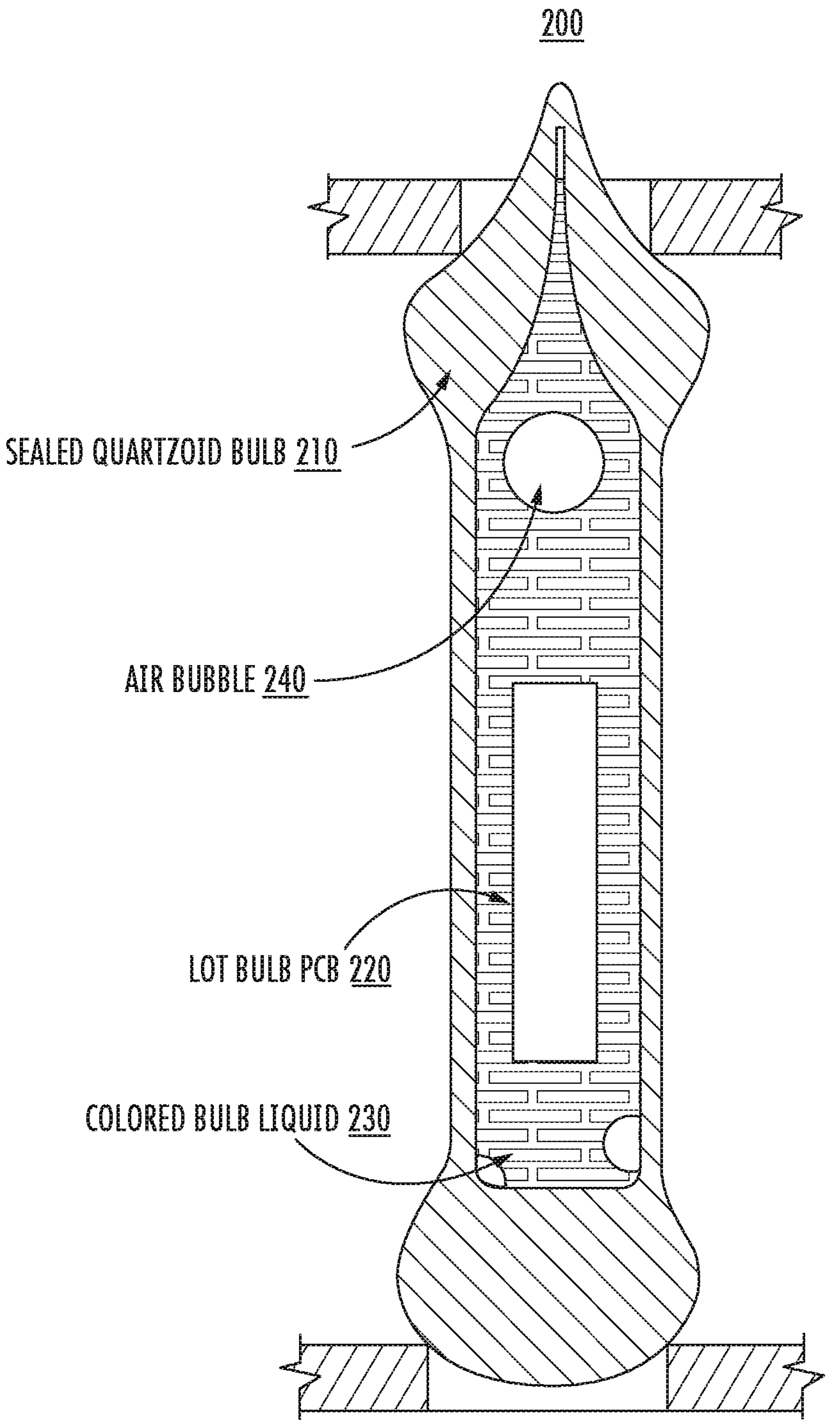
FIG. 2 depicts a sprinkler in accordance with one or more embodiments.

FIG. 2 depicts a diagram 200 of a sprinkler bulb 210 used in an example embodiment. The bulb 210 can be a sealed quartzoid bulb. The bulb 210 can be composed of various materials that can be designed to break at different levels. As shown, the bulb 210 also includes an IoT bulb printed circuit board (PCB) 220. The PCB 220 includes a plurality of circuit elements to perform the operations described herein. The various circuit elements are discussed with reference to FIG. 3. The bulb 210 is filled with a fluid/liquid 230 that is responsive to heating to build enough pressure in the bulb 210 to cause the bulb 210 to break which will activate the sprinkler. An air bubble 240 is left in the bulb 210 to allow the fluid to expand when pressurized from a heat source.

Figure 3:
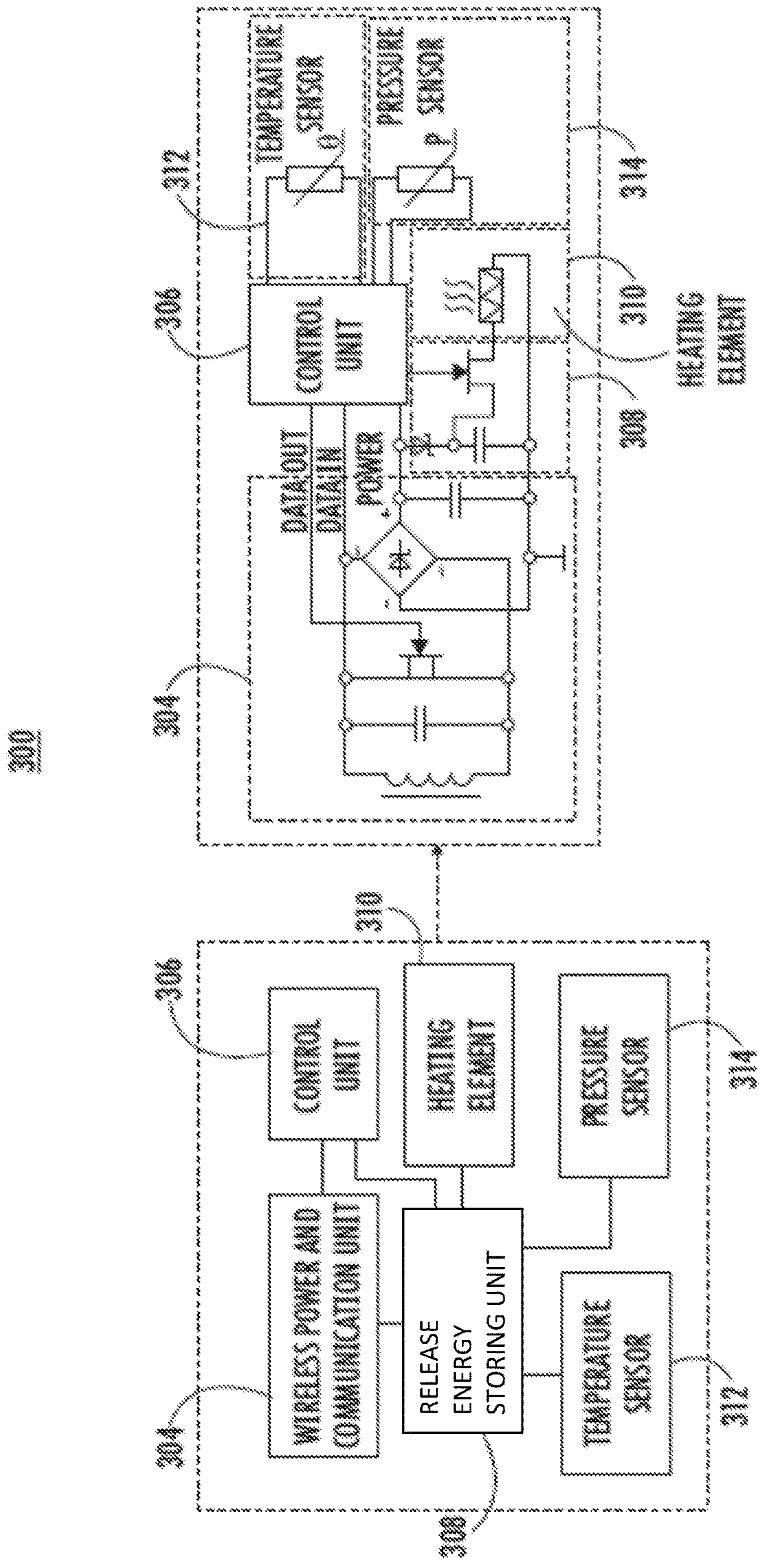
FIG. 3 depicts a circuit implemented in a sprinkler bulb in accordance with one or more embodiments.

FIG. 3 depicts a diagram 300 of an architecture the sprinkler bulb 210 in accordance with one or more embodiments. The wireless power and communication unit 304 is configured to communicate with an external system (not shown) such as an external fire system that performs a supervisory function or management function of the sprinklers. The wireless power and communication unit 304 is configured to receive and send data to the control unit 306. The wireless power and communication unit 304 is also configured to send a signal to the release energy storing unit 308 to charge the energy release storing unit 308.

An example of the architecture of the wireless power and communication unit 304 includes a plurality of circuit elements as shown in FIG. 3. In one or more embodiments, the wireless power and communication unit 304 includes RFID technology to receive the wireless signal to be stored in the energy storing unit 308. For example, the circuit can include a magnetic antenna to detect and receive the wireless signal.

The control unit 306 is configured for bidirectional communication. In particular, the control unit 306 is configured to receive data such as data from the external system. In some embodiments, the control unit 306 is configured to receive a test mode signal to perform a test of the bulb 210. In other embodiments, the data can include a status request for each of the sprinkler unit (based on the unique ID) such as activated/not activated or the data can include a command to trigger the activation of the heating element. The appropriate sensors, such as the temperature sensor 312 and pressure sensor 314, can be incorporated in the sprinkler to detect the temperature/pressure of the fluid in the bulb 210.

The control unit 306 is configured to send data to the wireless power and communication unit 304 such as the status information of a bulb along with a unique identifier. In addition, the control unit 306 is coupled to the energy storing unit 308 to trigger the activation of the heating element 310 by releasing the energy stored in the energy storing unit 308. In one or more embodiments, the control unit 306 can include a memory, such as a ROM, that stores a unique identifier so each individual sprinkler device can be addressed. The identifier can also be associated with the diagnostic data that is collected and transmitted to a controller, device, or system.

In one or more embodiments, the control unit 306 is configured to operate the sprinkler device in a normal mode and a test mode. In the normal mode, the bulb 210 will break when exposed to enough thermal energy to activate the sprinkler device. When operating in a test mode, the bulb 210 will perform a controlled test. The control unit 306 will send a command to the release energy storing unit 308 to causing the heating element 310 to heat the fluid 230 inside the bulb 210. The temperature and pressure measurements will be taken as the temperature and pressure changes inside the bulb 210. The results of the measurements can indicate a status or condition of the bulb 210 as discussed with reference to FIG. 4. If the results indicate a threshold pressure value is reached, there is no fault or crack in the bulb 210. However, a minimum threshold pressure value is not reached, an indication that a micro-crack or other damage to the bulb 210 can be determined.

As shown in FIG. 3, the release energy storing unit 308 includes a number of circuit elements including a diode, capacitor and a switch. The energy storing unit 308 is configured to store energy received from the wireless power and communication unit 304 in the capacitor. The switch is controlled by the control unit 306 and the output of the switch is coupled to the heating element 310 allowing the capacitor to discharge the stored energy into the heating element 310. It is to be understood that other configuration can be used for the energy storing unit 308.

As mentioned above, the heating element 310 can include a heating coil that is configured to heat the fluid of the bulb 210 responsive to the activation signal. It is to be understood that alternative mechanisms can be used in the sprinkler device where the heating element is an explosive element, ignitor element, semiconductor fuse, etc. that can be remotely operated. In one or more embodiments, the heating element 310 directly contacts the fluid in the bulb which allows heating of the fluid to break the bulb 210. In other embodiments, the PCB 220 is in contact with the fluid where the fluid is a non-conductive liquid that allows for the proper operations of the module.

The diagram 300 also includes a temperature sensor 312. The temperature sensor 312 is can be used to monitor the temperature of the environment in the bulb 210 during a test. The diagram 300 includes a pressure sensor 314 to monitor the pressure inside of the bulb 210. The bulb 210 is expected to reach a certain pressure at a given temperature which can indicate an intact bulb 210. A history of measurements can be used to build a profile for the bulb 210. The testing procedure can be updated based on the reading.

In some embodiments, a near-field communication standard can be used between the sprinkler and a reader device. In the event the reader performs the test of a particular sprinkler device, the location of the sprinkler device can be known. In some embodiments, the sprinkler identifier can be mapped to a sprinkler location and stored in a memory of a controller, system, or other memory location. Therefore the location of the sprinkler is known.

Figure 4:
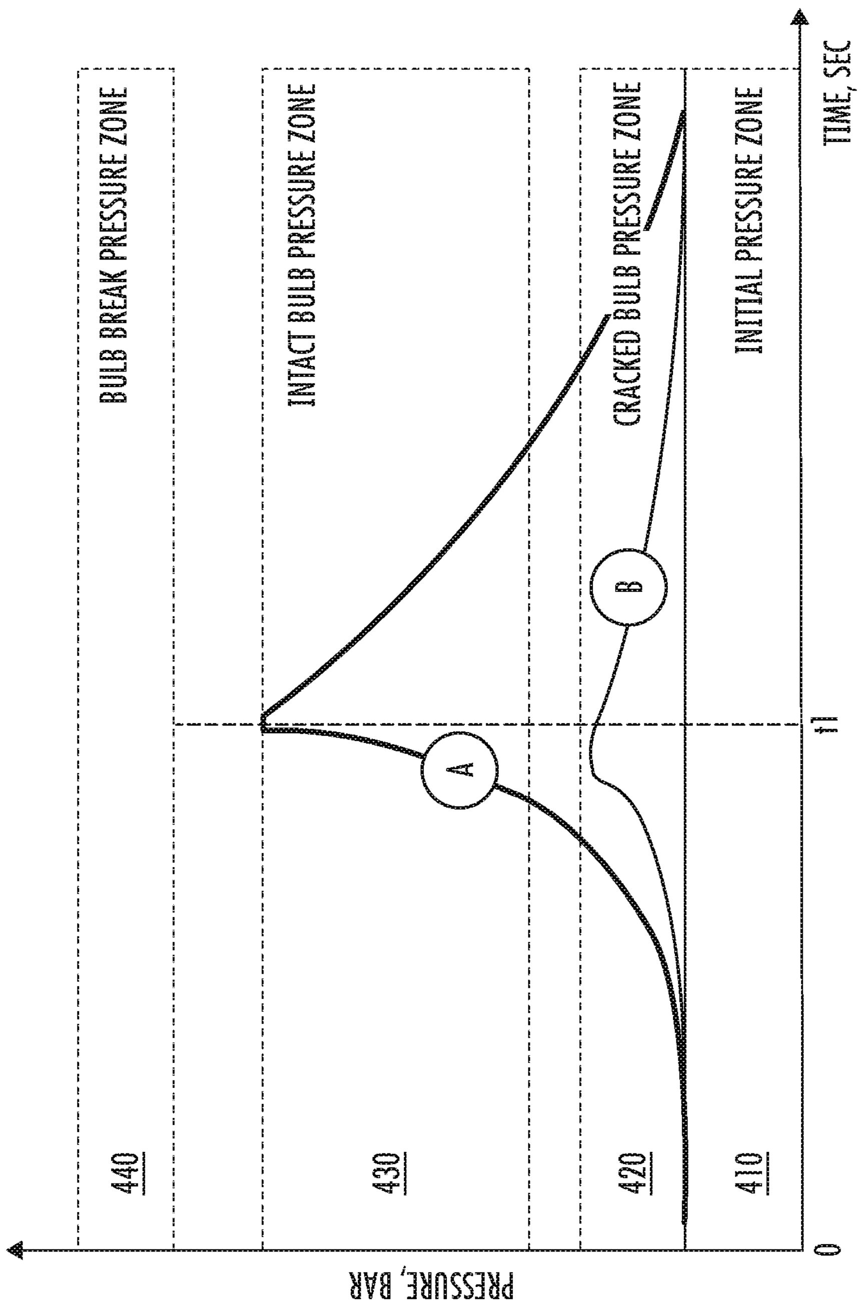
FIG. 4 depicts various detected states of the sprinkler bulb in accordance with one or more embodiments.

Now referring to FIG. 4, an example of various diagnostic ranges during a cracked bulb detection process. It should be understood that different ranges, zones, and values can be used based on the configuration of a particular sprinkler. For example, the curves are a function of the volume of fluid in the sprinkler bulb, the type of fluid, the type of material used for the frangible bulb etc. The x-axis indicates time (t) and the y-axis indicates the pressure that is measured at a particular instant. The heating element 310 is expected to raise the temperature of the fluid during a time period such as at point t1. The point t1 can be used as a reference point to test the integrity of the bulb.

The initial pressure zone 410 indicates the pressure range that is when the sprinkler bulb is intact.

The cracked bulb pressure zone 420 indicates a range where the bulb may have a micro-crack that prevents enough pressure from building up in the bulb to break the bulb. If enough pressure is not generated in the bulb as the temperature is increased from the heating element the bulb will not operate properly in the event fire suppression was needed.

The intact bulb pressure zone 430 indicates a pressure range that a bulb should be able to withstand before breaking. If the maximum value in the intact bulb pressure zone 430 is reached, the bulb will break, as shown in the bulb break pressure zone 440.

The curves A and B illustrate example results of testing an intact bulb and a bulb with a crack, respectively. The curve A shows that as the temperature is increased in the bulb from the heating element, the pressure increases to a point and then the pressure reduces as the bulb the heating element is turned off. The trend shows that the pressure is increasing in the bulb as expected. The curve B shows that as the temperature increases, the pressure is insufficient to break the bulb. A bulb illustrating the characteristics of the cracked bulb will require service or replacement.

Figure 5:
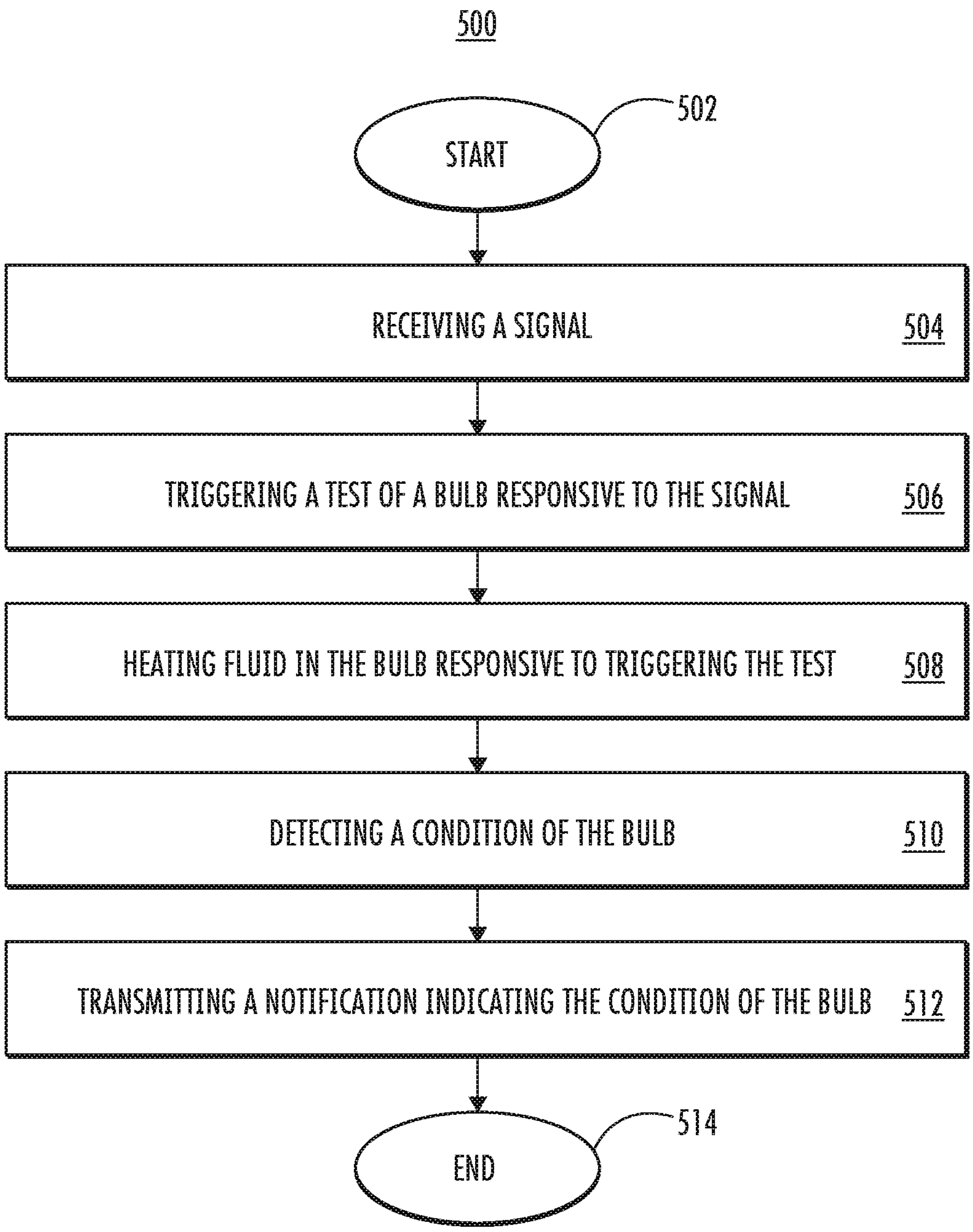
FIG. 5 depicts a flowchart of a method for performing a frangible bulb crack detection in accordance with one or more embodiments.

FIG. 5 depicts a flowchart for a method 500 for performing a crack detection function in a fire sprinkler with a frangible bulb. The method 500 begins at block 502 and continues to block 504 which provides for receiving a signal. In one or more embodiments, the signal is used to control the operational mode of the sprinkler bulb. The method 500 at block 506 which provides for triggering a test of a bulb responsive to the signal. The operation of the bulb changes from the normal mode to a test mode. Block 508 provides for heating fluid in the bulb responsive to the triggering the test. The fluid in the bulb is heated by a heating element to produce pressure to test the integrity of the bulb. That is the bulb is tested for cracks. Block 510 provides for detecting, by one or more sensors, a condition of the bulb. A pressure sensor is used to detect the pressure inside of the bulb and a temperature sensor is used to measure the temperature of the fluid inside the bulb. The method 500 at block 512 provides for transmitting a notification to a device indicating the condition of the bulb. The notification can include information including an identifier of the sprinkler bulb being tested, the measured temperature data, the measured pressure data, etc. The method 500 ends at block 514.

The technical effects and benefits include reducing time and human error during periodic inspection of frangible bulbs in the field. In addition, the technical effects and benefits provide for continuous testing which increases the safety by ensuring the bulb integrity for operation. The technical effects and benefits include quality tests that reduce the subjectivity of human error and provide for reliable diagnostics of sprinklers in areas that are difficult to access. Finally, no additional power is required to operate the system because the system uses energy provided from the wireless signal for operation.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A sprinkler comprising:

a sprinkler body having a fluid inlet;

a seal configured to prevent fluid flow through the sprinkler body when the seal is in a first position; and a bulb configured to retain the seal in the first position, the bulb configured to break at a temperature and allow the seal to move to a second position allowing fluid flow through the sprinkler body, wherein the bulb comprises:

a wireless power and communication unit configured to receive a test mode signal;

an energy storing unit configured to store energy for a heating element, wherein the energy is received from the wireless power and communication unit;

a control unit operably coupled to the wireless power and communication unit and the energy storing unit, wherein the control unit is configured to trigger a test of the sprinkler bulb;

the heating element configured to supply the energy to a fluid in the bulb responsive to the trigger;

one or more sensing elements configured to detect a condition of the bulb and the one or more sensing elements are in contact with the fluid in the bulb; and wherein the wireless power and communication unit is configured to transmit a notification indicating a detected condition of the bulb.

2. The sprinkler of claim 1, wherein the condition of the bulb indicates at least one of an intact bulb or a crack in the bulb.

3. The sprinkler of claim 1, wherein the control unit includes a memory configured to store a device identifier.

4. The sprinkler of claim 1, wherein the one or more sensing elements comprise at least one of a temperature sensor or a pressure sensor.

5. The sprinkler of claim 1, wherein operation of the bulb switches from a normal mode to a test mode responsive to receiving the test mode signal.

6. The sprinkler of claim 5, when operating in the normal mode, the bulb is a thermally responsive frangible bulb configured to break at a threshold temperature allowing the seal to move to the second position.

7. The sprinkler of claim 1, wherein the wireless power and communication unit comprises an RFID device configured to receive a wireless signal.

8. A method for operating the sprinkler of claim 1, the method comprising:

receiving, by the control unit, a signal;

triggering the test of the bulb responsive to the signal;

heating, by the heating element, fluid in the bulb responsive to the triggering the test;

detecting, by the one or more sensing elements, a condition of the bulb, wherein the one or more sensing elements are in contact with the fluid in the bulb; and transmitting a notification to a device indicating the condition of the bulb.

9. The method of claim 8, wherein the condition of the bulb indicates at least one of an intact bulb or a crack in the bulb.

10. The method of claim 8, further comprising storing a device identifier of the bulb in a memory.

11. The method of claim 8, wherein the one or more sensing elements comprise at least one of a temperature sensor or a pressure sensor.

12. The method of claim 8, further comprising switching operation of the bulb from a normal mode to a test mode responsive to receiving the signal.

13. The method of claim 12, when operating in the normal mode, the bulb is a thermally responsive frangible bulb configured to break at a threshold temperature allowing the seal to move to the second position.

14. The method of claim 8, further comprising communicating a notification indicating a detected condition of the bulb using an RFID device associated with the bulb.

15. The method of claim 8, wherein transmitting the notification comprises transmitting a sprinkler identifier, temperature measurements and pressure measurements of the environment within the bulb.

16. The method of claim 8, further comprising controlling the heating element responsive to detecting a threshold temperature value by one or more sensing elements.

17. A sprinkler system comprising:

a fluid source;

a pipe coupled to the fluid source;

a sprinkler coupled to the pipe, the sprinkler including a bulb housing a circuit configured to perform a test, the circuit comprises:

a wireless power and communication unit configured to receive a test mode signal;

an energy storing unit configured to store energy for a heating element, wherein the energy is received from the wireless power and communication unit;

a control unit operably coupled to the wireless power and communication unit and the energy storing unit, wherein the control unit is configured to trigger a test of the sprinkler bulb;

the heating element configured to supply the energy to a fluid in the bulb responsive to the trigger;

one or more sensing elements configured to detect a condition of the bulb and the one or more sensing elements are in contact with the fluid in the bulb; and wherein the wireless power and communication unit is configured to transmit a notification indicating a detected condition of the bulb.

18. The system of claim 17, further comprising a memory to store a history of temperature measurements and pressure measurements that can indicate a normal condition or abnormal condition of the bulb.

19. The system of claim 17, wherein the control unit switches operation of the bulb from a normal mode to a test mode responsive to receiving the test mode signal.

20. The system of claim 17, wherein the wireless power and communication unit transmits the notification, wherein the notification comprises transmitting a sprinkler identifier, temperature measurements and pressure measurements of the environment within the bulb.

* * * * *